3,513,088
OXIDATION OF A MERCAPTAN WITH EXCESS
DIMETHYL SULFOXIDE
Joseph V. Karabinos, Orange, and Christ N. Yiannios,
North Haven, Conn., assignors to Olin Mathieson
Chemical Corporation
No Drawing. Continuation of application Ser. No.
407,577, Oct. 29, 1964. This application Nov. 1,
1968, Ser. No. 774,572
Int. Cl. C10g 27/04; C07c 149/12
U.S. Cl. 208—189                                4 Claims

ABSTRACT OF THE DISCLOSURE

A mercaptan is oxidized to a disulfide by heating a mixture of dimethyl sulfoxide and the mercaptan at 30–100° C. An excess of sulfoxide of up to 10 moles per mole of mercaptan sulfur is used in the reaction, the excess serving as solvent for the mercaptan. The by-product dimethyl sulfide is recovered and oxidized to the sulfoxide by catalytic air oxidation. A specific utility for the dimethyl sulfoxide is in sweetening of a sour, mercaptan-containing petroleum fraction in accordance with the present reaction conditions, the dimethyl sulfide formed in the reaction and excess dimethyl sulfoxide are distilled off to recover the sweetened petroleum fraction.

---

This is a continuation of application Ser. No. 407,577 now abandoned.

This invention relates to an improved process for converting mercaptans to disulfides using dimethyl sulfoxide as oxidizing agent and reaction medium.

The art shows a variety of oxidizing agents suitable for the conversion of mercaptans to disulfides, for example, oxygen, nitric acid, hydrogen peroxide and potassium ferrocyanide, but these reagents oxidize many other functional groups as well as the mercaptan group. In some instances the formation of by-products makes isolation of the desired disulfide product difficult.

Dialkyl sulfoxides are known occasionally to act as mild oxidizing agents, for example, for oxidizing alkyl halides and tosylates to aldehydes as disclosed in U.S. Pat. 2,888,488. Also, Fletcher et al., Chem. Ind. (London) of 1957 at page 660 mention that increasing amounts of hydrogen bromide with p-chlorothiophenol in dimethyl sulfoxide gave increasing yields of di-p-chlorophenyl disulfide.

The process of this invention comprises heating a mixture of mercaptan and dimethyl sulfoxide at 30° to 110° C. for 1 to 24 hours and recovering the disulfide product.

The process as applied to monomercaptans appears to proceed according to the equation:

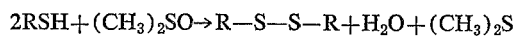

As applied to dimercaptans, polymeric products are formed:

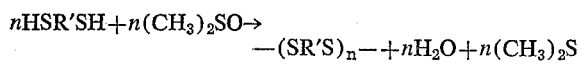

The stoichiometric requirement of sulfoxide is 1 mole for each 2 atoms of mercaptan sulfur, equivalent to a molar ratio of 0.5:1. However, according to the present invention, an excess of sulfoxide of up to 10 moles or more per mole of mercaptan sulfur is used, the excess serving as solvent for the starting material.

Dimethyl sulfoxide has special advantages in the process of the present invention because of the high volatility of the dimethyl sulfide by-product, its excellent solvent power, solubility in water, lower cost and availability. A further particular advantage of dimethyl sulfoxide used under the reaction conditions specified is that it is inert to the presence of substituents including alcoholic hydroxyl, amino, alkylamino, haloaryl, aldehyde and carboxyl substituents in the mercaptan and these substituents appear unchanged in the disulfide product.

In cyclic operation the by-product dimethyl sulfide is appropriately recovered and oxidized to the sulfoxide, suitably by catalytic air oxidation and the recovered sulfoxide is reused.

The process of the present invention is carried out usually at temperatures of from 30 to 110° C. and preferably, for most mercaptans, from 80 to 100° C. The reaction time is from 1 to 24 hours and for most mercaptans 2 to 8 hours is preferred.

Solvents in addition to the excess of dimethyl sulfoxide are not necessary but inert solvents can also be used in any desired proportion, including, for example, hydrocarbons and ethers. When the mercaptans are dissolved in a petroleum hydrocarbon, for example, sour petroleum fractions, including sour gasolines, dimethyl sulfoxide readily converts the mercaptans to disulfides and the gasolines are sweetened. Excess sulfoxide above the amount necessary for the conversion is added and any residual excess is readily removed by washing with water or aqueous media.

A wide variety of mercaptans are oxidized to disulfide products by dimethyl sulfoxide, including alkyl, aryl, aralkyl and heterocyclic mercaptans. Suitable mercaptans include arylthiols, for example, benzenethiol and toluenethiol, substituted arylthiols, for example, o-aminophenylthiol, p-chlorophenylthiol, p-bromophenylthiol, dichloro-, trichloro-, tetrachloro and pentachlorobenzenethiols and the correspondingly substituted toluenethiols. Also alkyl mercaptans of 1 to 18 carbons including methane, ethane, butane, dodecane, and octadecane thiols and substituted alkyl thiols including carboxyl, alkyl and hydroxy-alkyl thiols. For example, 1-dodecane thiol is oxidized to di-1-dodecyl disulfide; p-chlorothiophenol is oxidized to di-p-chlorophenyl disulfide and thiomalic acid is oxidized to dithiomalic acid.

In addition to the monothiols, dithiols are converted by dimethyl sulfoxide under the reaction conditions here claimed to novel polymeric disulfide products. Thermoplastic as well as infusible and insoluble polymers are obtained. Ethanedithiol, for example, yields a polymer which can be remelted and reshaped at about 140° C. A polymer from 2,5-dimercapto-1,3,4-thiadiazole does not fuse below 200° C.

The disulfide products are recovered in any suitable manner. The method varies depending on the physical properties of the disulfide product. Where the disulfide product is insoluble in water as, for example, in the case of diphenyl disulfide, the reaction mixture is mixed with a large volume of ice water and allowed to stand for several hours. The solid, water-insoluble disulfide is collected by filtration, washed with water and dried.

When the disulfide product is soluble in water as, for example, dithiodiglycolic acid, the excess sulfoxide is suitably removed by vacuum distillation. Some disulfides separate as solids or liquids from the sulfoxide solvent and are suitably removed by phase separation. To purify, they may be taken up in ether, washed with water, dried and distilled or recrystallized.

Example I

Two-tenths of a mole of benzenethiol was dissolved in 100 ml. of dimethyl sulfoxide and the solution was maintained at 84–86° C. Samples removed at intervals and analyzed for thiol and disulfide content showed the following conversions of thiol to diphenyl disulfide: 85% after 30 minutes, 92.4% after 1 hour, 96.7% after 2 hours, 98.3% after 4 hours, and 98.8% after 6 hours. The product solution after 6 hours was poured into a tenfold volume of ice-water and after standing for 3 hours, the precipitated diphenyl disulfide was collected by filtration, washed several times with water and dried under vacuum. It melted at 61–62° C.

Example II

A 250-ml. three-necked flask was equipped with a magnetic stirrer, thermometer, a nitrogen gas inlet tube, and an outlet to a trap cooled in Dry Ice. The flask was charged with 11 g. (0.1 mole) of benzenethiol and 50 ml. of dimethyl sulfoxide. The solution was heated with stirring at 80° for 18 hours with a continuous flow of nitrogen through the sysetm. Isolated as described in Example I, the diphenyl disulfide weighed 10.8 g., nearly theoretical yield, and melted at 61–62° C. Dimethyl sulfide and water were identified as by-products.

Example III

The procedure of Example II was repeated substituting 0.1 mole of alpha-toluenethiol as starting material. The resulting dibenzyl disulfide was obtained in 88% yield with a melting point of 71–72° C.

Example IV

One tenth of a mole of mercaptoacetic acid was dissolved in 50 ml. of dimethyl sulfoxide and the resulting solution was stirred at 80–90° C. for 8 hours. The hot solution was decolorized with charcoal and filtered. The filtrate was distilled under 3 mm. Hg pressure to remove excess dimethyl sulfoxide. Residual dithiodiglycolic acid was obtained in substantially quantitative yield and in a high state of purity.

Example V

One tenth of a mole of 1-butanethiol was dissolved in 50 ml. of dimethyl sulfoxide and the resulting solution was stirred at 80–90° C. for 8 hours. The di-n-butyl disulfide layer was separated and diluted with ether. The ether solution was washed several times with water, dried and the ether was distilled. The oil boiled at 90–90.5° C. at 3.7 mm.

Example VI

A 125 ml., two-necked flask was equipped with a water condenser through a Stark trap to trap low boiling sulfides generated in the reaction. The flask was also equipped with a magnetic stirring bar, thermometer and hot plate. Ethanedithiol (9.4 g.; 0.1 M) and excess dimethyl sulfoxide (50 ml.) were placed in the 125 ml., two-necked flask equipped as described. Stirring was started and heat was applied until the temperature reached 90° C. Within three-quarters of an hour a white crystalline solid was observed on the walls of the flask. Stirring was continued for 3 hours at 90° C. The reactants were cooled and poured into 500 ml. of cool water. A crystalline solid precipitate was filtered off, washed several times with water and dried. The yield of crude product was 9.0 g. (96%). It melted to a turbid liquid at 130°–137° C. A portion of the crude product was heated with excess dimethyl formamide and separated into two portions. The portion soluble in dimethyl formamide, recrystallized from dimethyl sulfoxide had a melting point of 127°–130° C. The molecular weight determined in dimethyl sulfoxide was 236±3% (theory for disulfide M.W. 186).

The portion insoluble in dimethyl formamide had a melting point of 130°–135° C. and solidified at once on cooling. It was a thermoplastic, hard, white material taking shape of the container. It is entirely insoluble in all common solvents at a concentration of one percent, even with heating.

Example VII

Dithioglycerol (12.3 g.; 0.1 M) and excess of dimethyl sulfoxide (50 cc.) were brought to a temperature of 100° C., using the same apparatus as described in Example VI. While the reaction was carried on, the dimethyl sulfide produced was removed by the Stark trap and the temperature in the flask was kept at about 100° C. After 7 hours, the dimethyl sulfoxide was distilled under reduced pressure. The residue was transferred to a separatory funnel and ethanol and ether were added. A viscous oily material separated on standing and was transferred to a round bottom flask, washed many times with ether and dried in a rotary aspirator while being heated. The molecular weight of this oil in dimethyl sulfoxide was 1326±3%, which indicated that about eleven thioglyceryl units (—S—$CH_2$—CH(OH)$CH_2$S—) were united to form a polymeric disulfide.

Example VIII

Dimercapto-p-xylene (0.081 M; 13.8 g.) and 100 cc. of dimethyl sulfoxide were mixed together in the same apparatus described in Example VI above. The reactants were heated at 100° C. for 2 hours. Within three-quarters of an hour dimethyl sulfide distilling at 34° C. was evolved while crystals separated in the reaction flask. The reaction mixture was cooled and stood overnight at room temperature. The crystallized product was filtered, washed with water, and left overnight in the open air to dry. Yield of polymer was 98%. M.P., 185°–192° C. The molecular weight determined in dimethyl sulfoxide at 90° C. was found to be 929±3%, indicating that about seven units have been combined together.

Example IX 2,5-dimercapto-1,3,4-thiadiazole (Bismuthiol 1) (0.079 M; 11.8 g.) was admixed with 100 cc. of dimethyl sulfoxide, using the apparatus described in Example VI. Even at room temperature, an exothermic reaction was noticed as soon as the two reactants were mixed together. The mixture of reactants was brought to 105° C. The solution turned from yellow to orange, then brown, and back to yellow. Within 10 minutes yellow crystals began precipitating and dimethyl sulfide was distilling off at 34° C. After a period of 2 hours at 105° C., the yellow precipitate was filtered off, washed with acetone and dried. The product was a yellow powder, which did not melt up to 200° C. but decomposed to a brown mass at that temperature.

We claim:

1. A process for oxidizing a mercaptan to a disulfide by heating a mixture of said mercaptan and dimethyl sulfoxide at 30° to 110° C. for a period of from 1 to 24 hours, the molar ratio of said sulfoxide to mercaptan sulfur in said mercaptan being about 10:1, and recovering the sulfide product from said mixture.

2. Process according to claim 1 in which said mixture is heated at 80° to 100° C. for 2 to 8 hours.

3. Process of sweetening a sour, mercaptan-containing petroleum fraction in which dimethyl sulfoxide is added to said petroleum fraction to form a mixture and said mixture is heated at 30° to 110° C. for a period of from 1 to 24 hours, the molar ratio of said sulfoxide to mercaptan sulfur in said petroleum fraction being about 10:1, distilling dimethyl sulfide and unreacted dimethyl sulfoxide from said mixture and recovering the sweetened petroleum fraction.

4. Process according to claim 3 in which said dimethyl sulfide is oxidized to dimethyl sulfoxide and the thus recovered dimethyl sulfoxide is re-used to sweeten additional sour, mercaptan-containing petroleum fraction.

References Cited

UNITED STATES PATENTS

| 3,052,626 | 9/1962 | Ferrara | 208—204 |
| 3,376,313 | 4/1968 | Wallace | 260—327 |

OTHER REFERENCES

Wallace: "Spontaneous Reaction of Aromatic Thiols with Sulfoxides," Chemistry and Industry, Mar. 21, 1964, pp. 501 and 502.

Wallace: "Reactions of Thiols with Sulfoxides I, Scope of the Reaction and Synthetic Applications," J. Am. Chem. Soc., vol. 86, No. 10, May 20, 1964, pp. 2018–2020.

DELBERT E. GANTZ, Primary Examiner

G. J. CRASANAKIS, Assistant Examiner

U.S. Cl. X.R.

260—607